(12) United States Patent
Edwards

(10) Patent No.: US 7,036,726 B1
(45) Date of Patent: May 2, 2006

(54) TAKEAWAY BELT WITH ITEM WEIGHT HANDLING

(75) Inventor: Thomas V. Edwards, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/320,594

(22) Filed: Dec. 16, 2002

(51) Int. Cl.
*G06K 15/00* (2006.01)

(52) U.S. Cl. .................................. 235/383; 705/16

(58) Field of Classification Search ................ 235/383, 235/385, 462.31, 462.15, 462.14; 705/16, 705/22, 23
See application file for complete search history.

(56) References Cited

U.S. PATENT DOCUMENTS

| | | | | |
|---|---|---|---|---|
| 3,707,826 A | * | 1/1973 | Cole | 53/384.1 |
| 4,939,355 A | * | 7/1990 | Rando et al. | 235/462.14 |
| 5,178,234 A | * | 1/1993 | Sakurai et al. | 186/61 |
| 5,343,025 A | * | 8/1994 | Usui | 235/383 |
| 5,375,680 A | * | 12/1994 | Ikeda et al. | 186/61 |
| 5,426,282 A | * | 6/1995 | Humble | 235/383 |
| 5,543,607 A | * | 8/1996 | Watanabe et al. | 235/383 |
| 5,900,614 A | * | 5/1999 | Nakakawaji et al. | 235/462.14 |
| 6,204,764 B1 | * | 3/2001 | Maloney | 340/568.1 |
| 6,213,395 B1 | * | 4/2001 | Dejaeger et al. | 235/383 |
| 6,315,199 B1 | * | 11/2001 | Ito et al. | 235/383 |
| 6,550,582 B1 | * | 4/2003 | Addy et al. | 235/383 |
| 6,581,759 B1 | * | 6/2003 | Kalm | 198/860.1 |
| 2003/0001007 A1 | * | 1/2003 | Lee et al. | 235/383 |
| 2003/0126019 A1 | * | 7/2003 | Taylor et al. | 705/21 |

FOREIGN PATENT DOCUMENTS

| | | | |
|---|---|---|---|
| DE | 3644533 A1 | * | 7/1988 |
| JP | 09245251 A | * | 9/1997 |
| WO | WO 03/007256 A2 | * | 1/2003 |

* cited by examiner

*Primary Examiner*—Michael G. Lee
*Assistant Examiner*—Uyen-Chau N. Le
(74) *Attorney, Agent, or Firm*—Maginot, Moore & Beck LLP

(57) ABSTRACT

A method of operation is provided of a retail terminal having: a housing; a take away belt having a first end adjacent the housing and a second end remote from the housing; a cover plate positioned over a gap between the housing and the first end of the take away belt; a sensor positioned adjacent the first end of the take away belt; a scale arranged to measure the weight of items placed on the belt; and a controller arranged to control the movement of the take away belt. The method includes the steps of: allowing placement of an item on the take away belt; moving the item away from the housing; detecting the weight of the item, and if a new weight item is detected; moving the item towards the housing, until the item is detected by the sensor, and then moving the item the opposite direction, away from the housing.

12 Claims, 2 Drawing Sheets

TAKEAWAY BELT WITH ITEM WEIGHT HANDLING

BACKGROUND

1. Field of the Invention

The present invention relates to a self-checkout system, for retail businesses, having a takeaway belt.

2. Background Information

General merchandise stores and retail grocery, supermarket, or food stores utilize retail purchase transaction terminals or checkout systems such as assisted and non-assisted (self) checkout systems (collectively, checkout systems) to consummate the purchase transaction.

FIG. 1 illustrates a self-checkout terminal suitable for use by a customer who wishes to purchase a small quantity of items, as will be described in more detail below. When larger quantities of goods are to be purchased a take away belt (or conveyor belt) is utilized. The belt, as depicted in accordance with the present invention, in association with FIGS. 2 to 5, will be described in detail below. However, it should be noted that the belt is located between the housing 11, adjacent the scanner 18 and the bag well 62 of the checkout of FIG. 1.

The use of a takeaway belt assembly with self-checkout equipment presents unique challenges related to the integration of the security scale with the belt assembly. One such challenge is the learning of new item weights.

A design objective for the takeaway belt self-checkout system is to present to the shopper a smooth and responsive system interface. The system should be supportive to the shopping operation, not obstruct it. Unfortunately, the detection of an unexpected weight for a regular item is one instance where intervention of the attendant is required. The attendant generally makes the determination that a new item weight exists versus an incorrect item has been substituted.

The behavior of the takeaway belt becomes integral to the resolution of this issue. FIG. 2 illustrates the typical takeaway belt assembly 100. The leading edge 102 of the takeaway belt 104 is protected by a hinged cover 106 that prevents small items from falling into the cabinetry. The cover 106 also provides a smooth transition from the scanner area 18 (FIG. 1) to the surface of the belt 104, and opens allowing service to be performed on the belt components. When the scale 16 (FIG. 1) detects an unexpected weight, the belt 104 is commonly reversed to bring the item back to the shopper for possible corrective action. It is at this point that the attendant commonly intervenes and approves the unexpected item weight as a new weight for the item. This commonly happens as a result of packaging changes, attached free items, etc.

When the belt 104 is reversed carrying the item back to the shopper, the event of the item interrupting a sensor 108 near the extreme leading edge 102 of the belt at which point the checkout stops the belt motor (not shown). Unfortunately, odd shaped items such as bottles may miss interrupting the sensor beam until several additional inches of belt travel have occurred. This often results in the item coming to rest partially on the belt cover 106, as illustrated in FIG. 3. This creates a problem when the attendant recognizes that the item on the belt is in fact a new weight variation for the previously known item and approves it. Unfortunately, because the item is resting partially on the cover, the scale is not supporting the full weight of the item. This results in an invalid weight being added to the security database for that item.

It would thus be advantageous to have a checkout system that alleviates the above-noted shortcomings and/or problems in current checkout systems.

SUMMARY

In accordance with an aspect of the subject invention, there is provided a method of operation of retail terminal comprising: a housing; a take away belt, having a first end adjacent said housing and a second end remote from said housing; a cover plate positioned over a gap between said housing and said first end of said take away belt; a sensor positioned adjacent said first end of said take away belt; a scale arranged to measure the weight of items placed on the belt; and control means arranged to control the movement of the take away belt, the method comprising the steps of: allowing placement an item on the take away belt; moving said item away from said housing; detecting the weight of said item, and if a new weight item is detected; moving said item towards the housing, until the item is detected by said sensor, and then moving said item the opposite direction, away from said housing.

In accordance with a second aspect of the present invention there is provided a retail terminal comprising: a housing; a take away belt, having a first end adjacent said housing and a second end remote from said housing; a cover plate positioned over a gap between said housing and said first end of said take away belt; a sensor positioned adjacent said first end of said take away belt; a scale arranged to measure the weight of items placed on the belt; and control means arranged to control the movement of the take away belt so as to move an item towards the housing if the scale detects a new weight item, until the item is detected by said sensor, and then to move the item in the opposite direction, away from said housing.

DETAILED DESCRIPTION OF THE INVENTION

Figure 1:
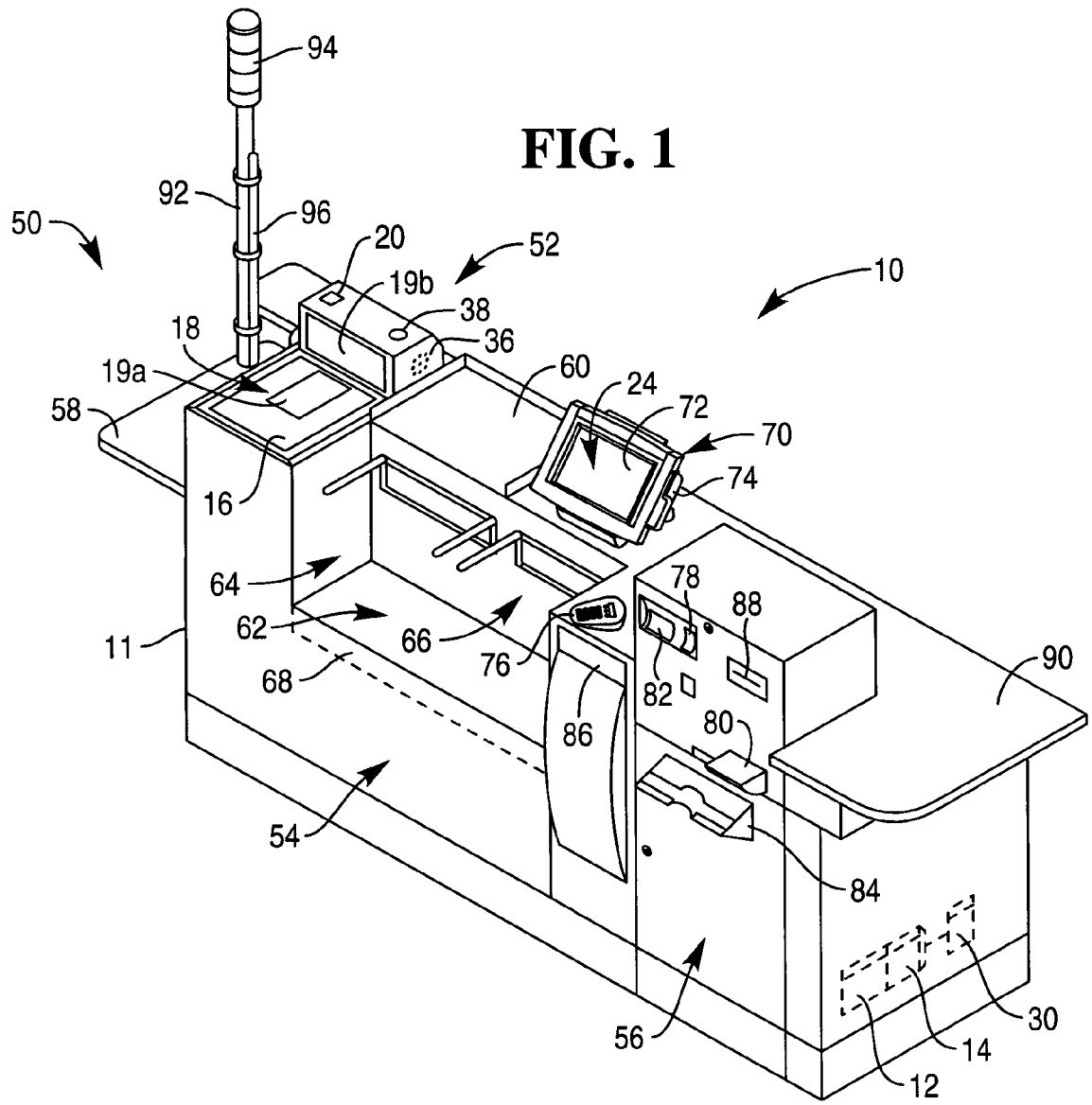
FIG. 1 is a perspective view of a retail terminal embodied as a self- checkout terminal.
Figure 2:
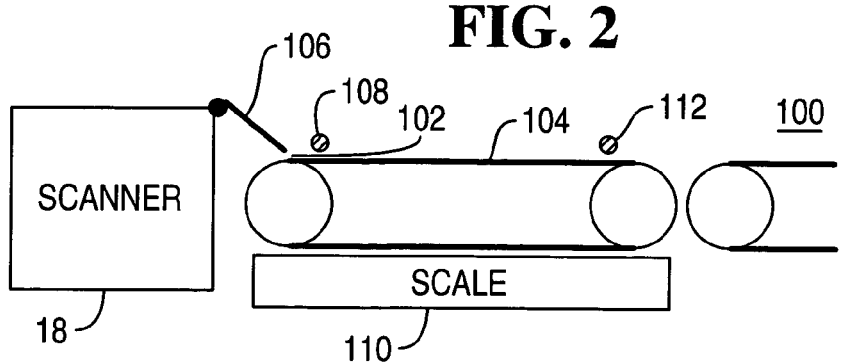
FIG. 2 is an illustration of a typical takeaway belt, sensors, and scale.

Referring to FIG. 1, there is depicted a retail terminal (such as a self-service checkout or self checkout system) generally designated 10 representing the retail terminal 10 previously discussed in which the subject invention may be utilized. The retail terminal 10 includes housing 11. Typically the retail terminal 10 is within a retail store such as a grocery store.

The retail terminal 10 is configured to perform a number of retail functions such as unassisted or "self-service" checkout functions. What is meant herein by the term "self-service checkout functions" or "self-service checkout transaction"

or "self-service purchase transaction" are those checkout functions or transactions that are performed by a checkout system by the customer himself or herself without the assistance of a clerk or other personnel employed by the retailer. For example, a self-service checkout (purchase) function or transaction would be performed on the retail terminal 10 in response to a customer himself or herself scanning or otherwise entering items for purchase into the checkout system, and thereafter depressing a payment key on the checkout system that indicates the manner by which the customer intends to pay for such items (e.g. by interaction with a credit/debit card reader or currency acceptor). Accordingly, what is meant herein by the phrase "self-service mode of operation" is a configuration of the retail terminal 10 that allows the system 10 to perform a self-service checkout (purchase) function or transaction.

In addition, what is meant herein by the term "customer" or "consumer" (in the context of the subject invention) is a person who enters a retailer's store, selects his or her items for purchase from the shopping area of the store, checks out his or her items for purchase at a checkout system such as the retail terminal 10 (including tendering payment for his or her items for purchase), and then exits the store subsequent to tendering payment. Hence, as used herein, a customer or consumer is distinguished from retail personnel such as a checkout clerk or other employee of the retailer in that a customer or consumer enters the place of business for the purpose of purchase items from the store. Moreover, what is meant herein by the term "retail personnel" is a person that is employed by the retailer to perform a retail activity such as assistance in operation or other function of the retail terminal 10. Also, the term "user" is herein used to refer to any operator of the retail terminal 10. Accordingly, a user may be retail personnel, a customer or consumer, or any other person who operates the retail terminal 10.

The retail terminal 10 includes a housing 11 that defines a pre-scan area 50, an itemization area 52, a bagging area 54, and a payment area 56. The pre-scan area 50 includes a shelf 58 on which a customer may place a shopping basket (not shown) or items for eventual scanning. In particular, the pre-scan area 20 provides a place where the customer can place items for purchase before scanning. It should be appreciated that the shelf 58 is only representative of a pre-scan area wherein a customer may place items for purchase.

The itemization area 52 of the retail terminal 10 includes the scanner 18 and the produce scale 16. The scanner 18 conventionally scans or reads a product identification code such as a Universal Product Code (UPC), industrial symbol(s), alphanumeric character(s), or other indicia associated with an item to be purchased. One scanner that may be used in the subject invention is a model number 7875 bi-optic scanner that is commercially available from NCR Corporation of Dayton, Ohio.

The scanner 18 includes a first scanning window 19a and a second scanning window 19b. The first scanning window 19a is disposed in a substantially horizontal manner, whereas the second scanning window 19b is disposed in a substantially vertical manner. The horizontal or first scanning window 19a is disposed in a relatively flush-mount arrangement with the produce scale 16 such that the produce scale 16 is integrated with the scanner 18. If an item such as produce is placed upon the produce scale 18 or the first scanning window 19a, the produce scale 18 may be used to determine the weight of the produce (item).

The scanner 18 includes a light source (not shown) such as a laser, a rotating mirror (not shown) driven by a motor (not shown), and a mirror array (not shown) such as is conventional in the art. In operation, a laser beam from the laser reflects off the rotating mirror and mirror array to produce a pattern of scanning light beams. As the product identification code on an item is passed over in front of the scanner 18, the scanning light beams scatter off the product identification code and are returned to the scanner 18 where they are collected and detected. The reflected light is then analyzed electronically in order to determine whether the reflected light contains a valid code pattern. If a valid code pattern is detected or present, the product identification code may then be utilized to retrieve product information associated with the item (e.g. the price of the item, product description, or the like). This information or code data is forwarded to the processor 12. The scanner 18 (or the scanner housing) also includes an activator 20 (in the case the produce scale is not an integral scale/actuator), the speaker 36 for providing sound, and the light 38 as an indicator. The scale 16 is operative in the manner set forth above.

The bagging area 54 includes a bagwell 62 that is of sufficient size to accommodate a first bag holder/bagging area 64 and a second bag holder/bagging area 66. The first and second bag holder/bagging areas 64 and 66 each are adapted to retain a plurality of paper and/or plastic bags (not shown) for holding scanned items to be purchased. The bagwell 62 is configured such that a bag and its contents (items scanned for purchase) rest upon a security scale 68. The security scale 68 is a weight scale that monitors the weight of items placed into a bag located in the bagwell 62. Such monitoring during a checkout transaction is particularly useful to prevent improprieties during the checkout transaction. The bagging area 54 also includes a post-scanning or set-aside area or shelf 60, on which a customer may place items before being bagged as described above. Items place on shelf 60 are weighed.

Particularly, the security scale 68 is utilized to monitor the ingress and egress of items into and out of the bagging area 54. More particularly, the security scale 68 is utilized to detect placement of items into and out of the bag wells 64 and, 66 and the shelf 60. Such item movement monitoring may be utilized to determine if the customer is unintentionally or intentionally committing an impropriety such as theft. For example, a control signal is generated when the scanner 18 successfully captures a product code associated with an item being entered into the retail terminal 10. The security scale 68 may be used to detect placement of an item into the bagging area 54 instead of being scanned by the scanner 18 in the itemization area 52. Moreover, when an item is scanned with the scanner 18 and thereafter placed into a bag in the bagwell 64 or 66, the detected weight of the item (as detected by the security scale 68) may be compared to a known weight value of the item that is stored in a database in the storage 30 in order to confirm that a different, more expensive item was not substituted for the scanned item or the settled or stable weight obtained by the produce scale 16 in the manner of the principles of the subject invention. It should be appreciated that the database may be in the form of a master database that includes every item sold by the retailer, or may be a "transaction level" database that is constructed locally at the retail terminal 10 during operation thereof.

The retail terminal 10 also includes a user interface terminal 70 for receiving input from and providing information to a customer. In particular, the retail terminal 10 includes an interactive customer interface terminal 70. The interactive customer interface terminal 70 includes a display monitor 24 that is provided to display retail information to the customer during operation of the retail terminal 10. For example, transaction information such as item price, item description, total amount of the transaction, instructions, weight on the scale 16, etc. is displayed to the customer via the display monitor 24 during operation of the retail terminal 10. Moreover, instructions may be displayed on the display monitor 24 that assist or otherwise guide the customer through operation of the retail terminal 10.

Additionally, customer-specific messages may be displayed to the customer on the display monitor 24 at certain times during a checkout transaction. What is meant herein by the term "customer-specific" in regard to messages is a retail message that is customized for a given customer based on the purchasing habits or other information that is unique to the customer. For example, a customer-specific message may include a customer-specific advertisement that advertises a product that was purchased by the customer during a previous visit to the retailer's store. The retail terminal 10 is configured to retrieve information from a customer profile database that contains information about each of the retailer's customers. Moreover, a customer-specific message may include a customer-specific advertisement that advertises a product that may be used in conjunction with a product that was previously scanned or otherwise entered into the retail terminal 10 during the current checkout transaction. As well, the customer-specific message may indicate that the customer needs to deactivate a detected EAS tag.

The display monitor 24 of the interactive customer interface terminal 70 preferably incorporates a known touch screen monitor 72 that can generate data signals when certain areas of the screen are touched by a customer. Hence, the display monitor 24 may be utilized by the customer to input information into the retail terminal 10. For example, the customer may manually enter retail information such as item codes and quantities into the retail terminal 10 by use of the touch screen 72 associated with the display monitor 24. The customer may indicate his or her preferred method of payment (e.g. cash, credit card, or debit card) by touching the appropriate area of the touch screen 72 associated with the display monitor 24. A portion of the touch screen 72 associated with the display monitor 24 may also be used as a signature capture area wherein a stylus 74 is used to input a customer's signature in the case of a credit card purchase or other type purchase requiring a signature.

The payment area 56 of the retail terminal 10 includes the system components necessary to allow a customer to perform retail finalization functions such as tendering payment for his or her items for purchase and printing of purchase transaction receipts. In particular, the payment area 56 of the retail terminal 10 includes an electronic payment terminal 76 having a card reader and keypad, a pair of currency acceptors such as a coin acceptor 78 and a bill acceptor 82, a corresponding pair of currency dispensers such as a coin dispenser 80 and a bill dispenser 84, and a receipt printer 86. As shown in FIG. 1, the system components associated with the payment area 56 are positioned to face the customer.

The system components associated with the payment area 56 of the retail terminal 10 are provided to allow the customer to tender payment for his or her items for purchase. In particular, once the customer has entered all of his or her items for purchase into the checkout terminal 10 during a self-service checkout/purchase transaction, the components associated with the payment area 56 are utilized to complete the self-service checkout/purchase transaction by (1) allowing payment to be tendered by either insertion of currency into a currency acceptor (i.e. the coin acceptor 78 and/or the bill acceptor 82), charging a credit card or debit card account, or decreasing a value amount stored on a smart card, cash card, or gift certificate card via the electronic payment terminal 76, and (2) printing a purchase transaction receipt with the receipt printer 86. In the case of when a customer inserts currency into the coin acceptor 78 and/or the bill acceptor 82, the retail terminal 10 may provide change via the coin dispenser 80 and/or the bill dispenser 84. The payment area 56 also includes a coupon acceptor 88 that is adapted to receive coupons. The coupon acceptor 88 is operative to read indicia on a coupon to determine if the coupon has expired, the amount, and to correlate whether an item corresponding to the coupon has been scanned for purchase. At the end of the payment area is a set-aside shelf 90. The set-aside shelf 90 may be used for various purposes such as putting aside bread before placing the same into a bag until the bag is essentially full with heavy items.

The retail terminal 10 also includes an accessory pole 92 that supports a status light device 94, and an antenna/paging device 96. The accessory pole 92 may also support a camera (not shown). The status light device 94 and the antenna/paging device 96 are provided in order to notify store personnel, such as a customer service manager, if intervention into the current checkout transaction is needed. In particular, if during operation of the retail terminal 10, an intervention-needed activity is detected, the status light device 94 and/or the antenna/paging device 96 are operated so as to summon retail personnel, such as the customer service manager. What is meant herein by the term "intervention-needed activity" is (1) activity by the customer or retail personnel in which the retail terminal 10 is unintentionally operated improperly, (2) activity by the customer or retail personnel in which it can be inferred with a high degree of confidence that the retail terminal 10 is intentionally operated improperly for illicit purposes such as theft, (3) activity by the customer or retail personnel in which the customer or retail personnel operates an in put device associated with the retail terminal 10 in a manner that indicates the he or she is in need of assistance, and (4) activity by the components associated with the retail terminal 10 that has rendered the system in need of maintenance or other type of service.

An intervention-needed activity may take the form of a security-breach activity in which the retail terminal 10 is being operated in a manner that is placing the retailer in a position of potential financial loss due to goods being taken from the store without having first been paid for (either intentionally or unintentionally), less than all the goods being weighed in the case of produce that results in a false total price for the produce, or a non-security-breach activity in which the customer is in need of assistance or the retail terminal 10 is in need of maintenance, but wherein the retailer is not at risk of financial loss due to goods being taken from the store without having been paid for first. The retail terminal 10 may also have a video monitoring system (not shown).

Figure 3:
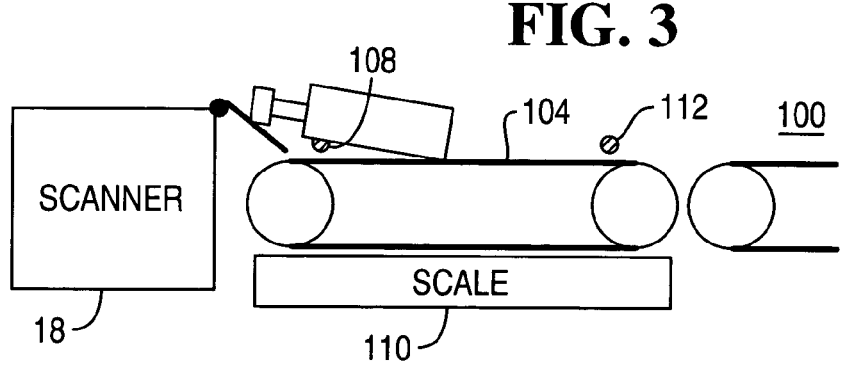
FIG. 3 is an illustration of the belt of FIG. 2, on which a bottle has been reversed, because of a weight mismatch, coming to rest partially on the cover plate producing an invalid scale weight.
Figure 4:
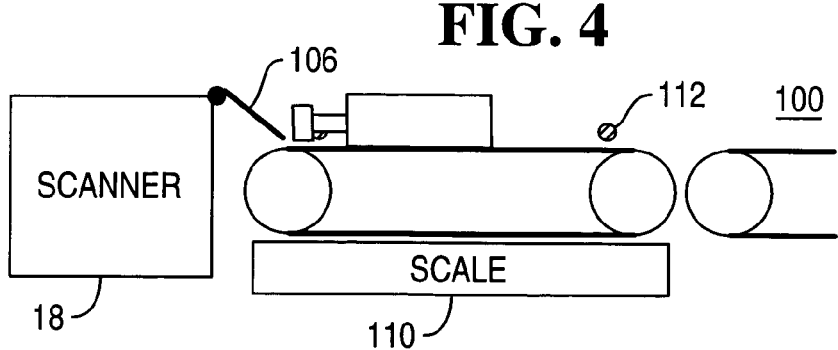
FIG. 4 is an illustration of the belt of FIG. 2 in which the bottle has been pulled forward off the belt cover, coming to rest completely on the belt/scale thereby producing a valid weight measurement.

FIGS. 3 and 4 illustrate operation of a self-checkout take away belt, in accordance with the present invention. When an item of new weight is detected, by the scale 110, take away belt 104 is reversed until the item interrupts a reverse stop sensor 108, possibly leaving the item partially on the belt cover 106, as illustrated in FIG. 3. The belt is then reversed briefly so as to pull the item off the cover plate 106 so as to rest fully on the belt 104 and the underlying scale 110. With the full item resting on the belt and thus the scale, the correct weight is now measured by the system and processed, as normal. As a result, an attendant is presented with a correct new item weight to approve without direct intervention. Note that the reverse stop sensor 108 is an RF sensor.

Figure 5:
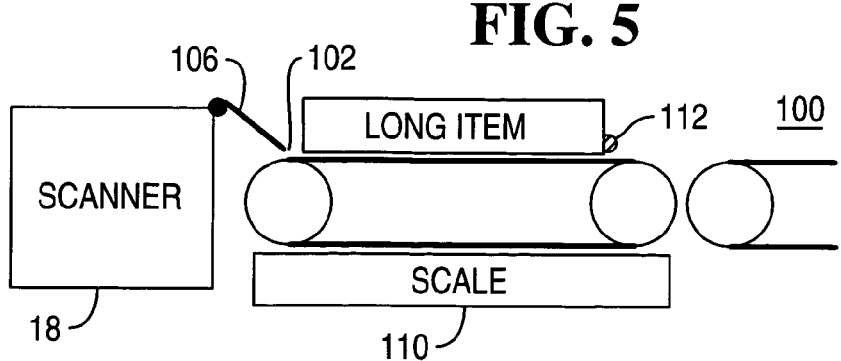
FIG. 5 is an illustration of the belt of FIG. 2 used to properly position a large item, for weighing.

The checkout further includes a scale stop sensor 112, positioned adjacent the opposite end of the belt 104 from the reverse stop sensor 108. This sensor 112 becomes significant when the belt is fully reversed because of a long item of new weight, and is subsequently moved forward to pull the long item off the belt cover, see FIG. 5. The long item then interrupts the scale stop sensor 112, resulting in the forward motion of the belt 104 (away from the scanner 18) being immediately stopped. This will occur when an unusually long item is placed on the takeaway belt and a new weight is registered. The stopping of the belt in response to the actuation of the scale stop sensor 112 makes it much more likely that the complete item will come to rest fully on the scale producing a correct weight measurement, as shown in FIG. 5.

Modifications may be incorporated without departing from the spirit or scope of the present invention as defined in the following claims.

What is claimed is:

1. A method of operating a retail terminal having (i) a housing, (ii) a scanner supported by said housing, (iii) a take away belt with a first end thereof positioned adjacent to said housing, and a second end thereof positioned remote from said housing, (iv) a cover plate positioned over a gap defined between said housing and said first end of said take away belt, (v) a first sensor positioned adjacent to said first end of said take away belt, and (vi) a scale configured to measure weight of items placed on said take away belt, comprising the steps of:
    (a) moving an item positioned on said take away belt in a first direction away from said scanner and said gap;
    (b) determining if said item positioned on said take away belt is a new weight item;
    (c) in response to said item being determined to be a new weight item in step (b), reversing movement of said take away belt so as to move said item with said take away belt in a second direction toward said scanner and said gap until said item is detected by said first sensor; and
    (d) in response to said item being detected by said first sensor in step (c), again reversing movement of said take away belt so as to move said item in said first direction away from said scanner and said gap with said take away belt.

2. The method of claim 1, wherein said retail terminal further has a second sensor positioned adjacent to said second end of said take away belt, further comprising the step of:
    (e) after step (d), stopping movement of said take away belt in response to said item being detected by said second sensor.

3. A retail terminal, comprising:
    a housing;
    a scanner supported by said housing;
    a take away belt having (i) a first end positioned adjacent to said housing, and (ii) a second end positioned remote from said housing;
    a cover plate positioned over a gap defined between said housing and said first end of said take away belt;
    a first sensor positioned to detect items positioned on said take away belt;
    a scale configured to measure weight of items positioned on said take away belt; and
    a controller operable to control movement of said take away belt so as to perform the following steps:
    (a) move an item positioned on said take away belt in a first direction away from said scanner and said gap;
    (b) in response to said item being determined to be a new weight item, reversing movement of said take away belt so as to move said item with said take away belt in a second direction toward said scanner and said gap until said item is detected by said first sensor; and
    (c) in response to said item being detected by said first sensor in step (b), again reversing movement of said take away belt so as to move said item away from said scanner and said gap with said take away belt in said first direction.

4. The retail terminal of claim 3, further comprising a second sensor, wherein:
    said first sensor is positioned adjacent to a first end of said take away belt, and
    said second sensor is positioned adjacent to a second end of said take away belt.

5. The retail terminal of claim 3, wherein said first sensor is an RF sensor.

6. The terminal of claim 3, wherein said controller is further operable to perform the following step:
    (d) after step (c), stopping movement of said take away belt in response to said item being detected by said second sensor.

7. A method of operating a retail terminal having (i) a housing, (ii) a scanner supported by said housing, (iii) a take away belt with a first end thereof positioned adjacent to said housing, and a second end thereof positioned remote from said housing, (iv) a first sensor positioned to detect items positioned on said take away belt, and (v) a scale configured to measure weight of items placed on said take away belt, comprising the steps of:
    (a) determining if an item positioned on said take away belt is a new weight item;
    (b) in response to said item being determined to be a new weight item in step (a), reversing movement of said take away belt so as to move said item with said take away belt toward said scanner until said item is detected by said first sensor; and
    (c) in response to said item being detected by said first sensor in step (b), again reversing movement of said take away belt so as to move said item away from said scanner with said take away belt.

8. The method of claim 7, wherein said retail terminal further has a second sensor positioned adjacent to said second end of said take away belt, further comprising the step of:
    (d) after step (d), stopping movement of said take away belt in response to said item being detected by said second sensor.

9. A retail terminal, comprising:
    a housing;
    a scanner supported by said housing;
    a take away belt having (i) a first end positioned adjacent to said housing, and (ii) a second end positioned remote from said housing;

a first sensor positioned to detect items positioned on said take away belt;

a scale configured to measure weight of items positioned on said take away belt; and a controller operable to control movement of said take away belt so as to perform the following steps:
- (a) in response to an item being determined to be a new weight, reversing movement of said take away belt so as to move said item with said take away belt toward said scanner until said item is detected by said first sensor; and
- (b) in response to said item being detected by said first sensor in step (a), again reversing movement of said take away belt so that said item is moved away from said scanner with said take away belt.

10. The retail terminal of claim 9, further comprising a second sensor, wherein:
- said first sensor is positioned adjacent to a first end of said take away belt, and
- said second sensor is positioned adjacent to a second end of said take away belt.

11. The retail terminal of claim 9, wherein said first sensor is an RF sensor.

12. The terminal of claim 9, wherein said controller is further operable to perform the step:
- (c) after step (b), stopping movement of said take away belt in response to said item being detected by said second sensor.

* * * * *